United States Patent
Howard

(10) Patent No.: US 7,748,751 B2
(45) Date of Patent: Jul. 6, 2010

(54) SYSTEMS AND METHODS FOR MAKING CONNECTIONS BETWEEN PIPE SECTIONS TO FORM A CONDUIT THAT IS SUBSTANTIALLY FREE OF GAPS

(75) Inventor: Erik M. Howard, Baytown, TX (US)

(73) Assignee: Taper-Lok Corporation, Houston, TX (US)

(*) Notice: Subject to any disclaimer, the term of this patent is extended or adjusted under 35 U.S.C. 154(b) by 84 days.

(21) Appl. No.: 11/933,484

(22) Filed: Nov. 1, 2007

(65) Prior Publication Data

US 2009/0115188 A1    May 7, 2009

(51) Int. Cl.
*F16L 23/00* (2006.01)
(52) U.S. Cl. .................................. 285/368; 29/525.02
(58) Field of Classification Search .................. 285/368, 285/364, 365, 366, 367; 29/237, 525.02
See application file for complete search history.

(56) References Cited

U.S. PATENT DOCUMENTS

| | | | | |
|---|---|---|---|---|
| 1,014,053 A | * | 1/1912 | Dolensky | 285/332.3 |
| 2,046,597 A | * | 7/1936 | Abegg | 277/602 |
| 2,305,668 A | * | 12/1942 | Bruno | 285/331 |
| D135,689 S | * | 5/1943 | Rocic | D23/265 |
| 2,687,229 A | * | 8/1954 | Laurent | 220/240 |
| 2,695,184 A | * | 11/1954 | Hobbs | 285/54 |
| 2,760,673 A | * | 8/1956 | Rudman et al. | 220/239 |
| 2,992,840 A | * | 7/1961 | Reynolds et al. | 285/332.3 |
| 3,016,249 A | * | 1/1962 | Contreras et al. | 285/336 |
| 3,240,501 A | * | 3/1966 | Smith | 277/614 |
| 3,421,652 A | * | 1/1969 | Warman | 220/320 |
| 3,630,553 A | * | 12/1971 | Foulger | 285/340 |
| 3,792,878 A | * | 2/1974 | Freeman | 285/150.1 |
| 4,452,474 A | * | 6/1984 | Hagner | 285/334.1 |
| 4,648,632 A | * | 3/1987 | Hagner | 285/334.1 |
| 4,693,502 A | * | 9/1987 | Oetiker | 285/334.5 |
| 4,812,285 A | * | 3/1989 | Stapleton | 376/203 |
| 4,832,380 A | * | 5/1989 | Oetiker | 285/328 |
| 4,840,410 A | * | 6/1989 | Welkey | 285/261 |
| 4,861,077 A | * | 8/1989 | Welkey | 285/334.1 |
| 4,885,122 A | * | 12/1989 | Stapleton | 376/203 |
| 6,279,964 B1 | * | 8/2001 | Watts | 285/179 |
| 6,454,316 B1 | * | 9/2002 | Aaron, III | 285/379 |
| 7,118,139 B2 | * | 10/2006 | Katorgin et al. | 285/368 |

* cited by examiner

*Primary Examiner*—David E Bochna
(74) *Attorney, Agent, or Firm*—Law Offices of Mark L. Berrier

(57) ABSTRACT

Systems and methods for making connections between pipe sections. In one embodiment, a pipe connection consists of a pair of flanges having conically tapered sealing surfaces and a tapered seal ring. A first one of the flanges has a male nose extending forward from the face of the flange, while a second one of the flanges has a female pocket which is recessed into the flange. The seal ring has conically tapered surfaces complementary to those of the flanges so that, when the connection is assembled, a seal is created between the seal ring and each of the flanges. The nose of the male flange extends forward so that, when the connection is assembled, the nose makes direct contact with the pocket of the second flange, forming a substantially gap-free conduit through the flanges.

7 Claims, 3 Drawing Sheets

SYSTEMS AND METHODS FOR MAKING CONNECTIONS BETWEEN PIPE SECTIONS TO FORM A CONDUIT THAT IS SUBSTANTIALLY FREE OF GAPS

BACKGROUND

1. Field of the Invention

The invention relates generally to pipeline connections, and more particularly to systems and methods for making connections between pipe sections where the connections form a conduit that is substantially free of gaps that can promote buildup of scale or solidified polymers that impede the flow of fluids through the pipeline, as well as crevice corrosion that can cause the connections to fail.

2. Related Art

The use of pipelines for handling fluids is widely known. High-volume pipelines are commonly used to carry oil, gas and other fluid hydrocarbons. High-pressure or high-temperature pipelines are commonly used in industrial applications. Pipelines may also be designed for many other purposes, such as carrying corrosive, toxic or otherwise dangerous fluids.

The pipelines used in these applications normally consist of a number of pipe sections which are connected end-to-end to form a single conduit. Typically, the pipe sections are joined by means of couplings or connectors which consist of a set of flanges attached to the ends of the pipe sections. The flanges are bolted or held together in some other manner to form a continuous conduit.

In order to ensure that the couplings between pipe sections form tight seals, conventional (e.g., ANSI) couplings normally include a gasket or some other type of seal ring positioned between the flanges of the couplings. As the flanges of the coupling are drawn together (e.g., by tightening a set of bolts that hold them together) the seal ring is compressed between the flanges. The coupling is tightened enough to apply a desired load between the flanges and the seal ring, thereby achieving the desired seal.

When a conventional coupling is fully assembled and tightened, there is normally a gap between the flanges. As noted above, the seal is provided by compression of the seal ring between the flanges, rather than contact between the flanges themselves. Further, it may be necessary to leave a gap between the flanges in order to account for manufacturing tolerances while still allowing the appropriate load to be applied to the seal ring. In some applications, however, the gap between the flanges may cause various problems.

In polymer processing systems, for example, the gap between the flanges can cause turbulence and/or stagnation in the flow of polymer materials which are transported through the pipelines. This, in turn, can cause the polymer materials to solidify and build up in the pipeline at the coupling. As the solidified polymer material builds up, the flow of the polymer material through the pipeline is restricted. The couplings in the pipeline must therefore be periodically dismantled and the solidified polymer material removed. This is an extremely expensive process, due to both the cost of dismantling/cleaning the couplings and the cost associated with downtime of the system.

In another example, the presence of a gap between the flanges can lead to crevice corrosion in pipelines that transport corrosive fluids. For instance, in one gasoline refining system, a hydrofluoric acid solution is transported through pipelines for use as a catalyst. The hydrofluoric acid solution is very reactive and therefore very corrosive. Gaps between the coupling flanges allow the hydrofluoric acid solution to react with the metal of the flanges, resulting in the build-up of scale and the leaching of carbon from the steel flanges. The scale can cause turbulence and hinder the flow of the acid solution through the pipeline, and the leaching of the carbon from the steel can make the steel more brittle and prone to failure.

It would therefore be desirable to provide systems and methods for connecting pipe sections for use in these types of industrial applications, where the couplings between pipe sections minimize or eliminate the gaps that are present between the flanges of conventional pipe couplings.

SUMMARY OF THE INVENTION

This disclosure is directed to systems and methods for making connections between pipe sections that solve one or more of the problems discussed above. In one particular embodiment, a pipe connection consists of a pair of flanges having conically tapered sealing surfaces and a tapered seal ring. A first one of the flanges has a male nose extending forward from the face of the flange, while a second one of the flanges has a female pocket which is recessed into the flange. The seal ring has conically tapered surfaces complementary to those of the flanges so that, when the connection is assembled, a seal is created between the seal ring and each of the flanges. The nose of the male flange extends forward so that, when the connection is assembled, the nose makes direct contact with the pocket of the second flange, forming a substantially gap-free conduit through the flanges.

One embodiment comprises a gapless pipe connection having a female flange, a male flange and a seal ring. The female flange has an inward-facing conically tapered sealing surface and the male flange has an outward-facing conically tapered sealing surface. The seal ring has an outward-facing conically tapered surface complementary to the sealing surface of the female flange, and an inward-facing conically tapered surface complementary to the sealing surface of the male flange. The seal ring is positioned between the male and female flanges with the sealing surfaces of the seal ring in contact with the complementary sealing surfaces of the male and female flanges. The connecton of the male and female flanges and the seal ring form a conduit therethrough, the interior wall of which is substantially free of gaps.

In one embodiment, a nose portion of the male flange is in contact with a pocket portion of the female flange at the conduit wall to form the interior conduit wall. The nose portion of the male flange is configured in one embodiment to be deformed by contact pressure from the seal ring in the assembled connection. In this embodiment, the nose portion of the male flange has a first inner diameter when the connection is not assembled and a second, smaller inner diameter when the connection is assembled and the nose portion is deformed. In one embodiment, the seal ring includes a tapered portion which includes the inward-facing and outward-facing conically tapered surfaces, and a second portion which extends radially inward from the tapered portion. This second portion of the seal ring fills a space between the nose portion of the male flange and the pocket portion of the female flange so that there is no gap in the interior conduit wall. In another embodiment, the seal ring has a wedge-shaped cross-section Another embodiment of the invention comprises a method for making a gapless pipe connection. In this method a female flange having an inward-facing conically tapered sealing surface and a male flange having an outward-facing conically tapered sealing surface are provided. A seal ring having conically tapered surfaces complementary to the sealing surfaces of the male and female flanges is also provided. The seal ring is positioned between the conically tapered surfaces of the male and female flanges, and the male and female flanges are drawn together until the flanges and the seal ring make contact with each other, thereby forming a conduit wall which is substantially free of gaps.

Another embodiment of the invention comprises a method for manufacturing a gapless pipe connection. This method includes providing a female flange having an inward-facing conically tapered sealing surface and a male flange having an outward-facing conically tapered sealing surface, as well as a seal ring having conically tapered surfaces complementary to the sealing surfaces of the male and female flanges. The pipe connection is assembled by positioning the seal ring between the conically tapered surfaces of the male and female flanges and drawing the flanges together until male flange, the female flange and/or the seal ring make contact with each other, thereby deforming a nose portion of the male flange. The conduit wall within at least the male flange is then machned to form a smooth bore through the pipe connection.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1A:
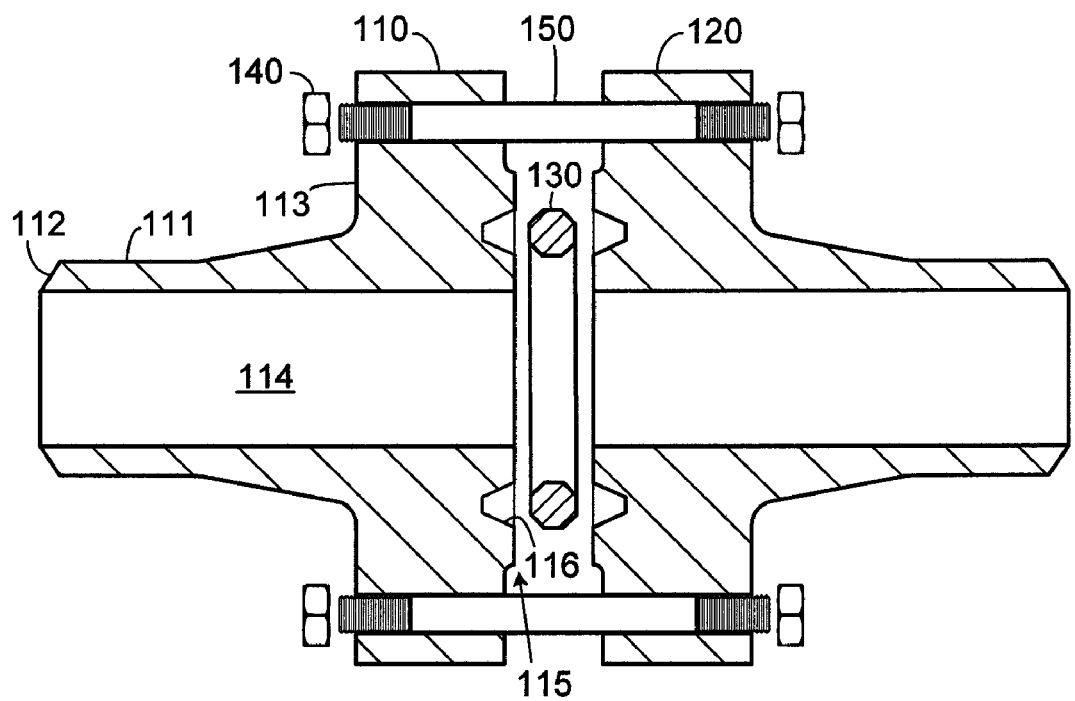
FIGS. 1A and 1B are diagrams illustrating the components of an ANSI-type pipe connection in disassembled and assembled states.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for making connections between pipe sections that form a conduit which is substantially free of gaps. By minimizing or eliminating the gaps that are found in prior art pipe connections, embodiments of the present invention can reduce buildup of scale or solidified polymers that impede the flow of fluids through the pipeline. Reducing or eliminating the gaps can also reduce crevice corrosion that may cause the connections to become more prone to failure.

In one embodiment, a pipe connection consists of a pair of flanges having conically tapered sealing surfaces and a tapered seal ring. A first one of the flanges has a male nose extending forward from the face of the flange, while a second one of the flanges has a female pocket which is recessed into the flange. The male nose of the first flange has an outward-facing conically tapered sealing surface. The female pocket of the second flange has an inward-facing conically tapered sealing surface. The seal ring has conically tapered surfaces complementary to those of the flanges so that, when the connection is assembled, a seal is created between the seal ring and each of the flanges.

In this embodiment, the male nose of the first flange extends forward so that, when the connection is assembled, the male nose makes direct contact with the female pocket of the second flange, rather than only making contact with the seal ring. The two flanges make contact at the interior wall of the conduit which is formed by the flanges, so that there is substantially known gap between the flanges along the interior wall. This is very different from prior art connections that utilize tapered sealing surfaces because the prior art connections are designed to leave a gap between the flanges. This gap is conventionally thought to be necessary in order to allow the contact pressure on the seal ring to be adjusted. In other words, if there is no gap between the flanges, the flanges cannot be drawn closer, so the contact pressure applied to the seal ring cannot be increased, which is conventionally undesirable.

Figure 1B:
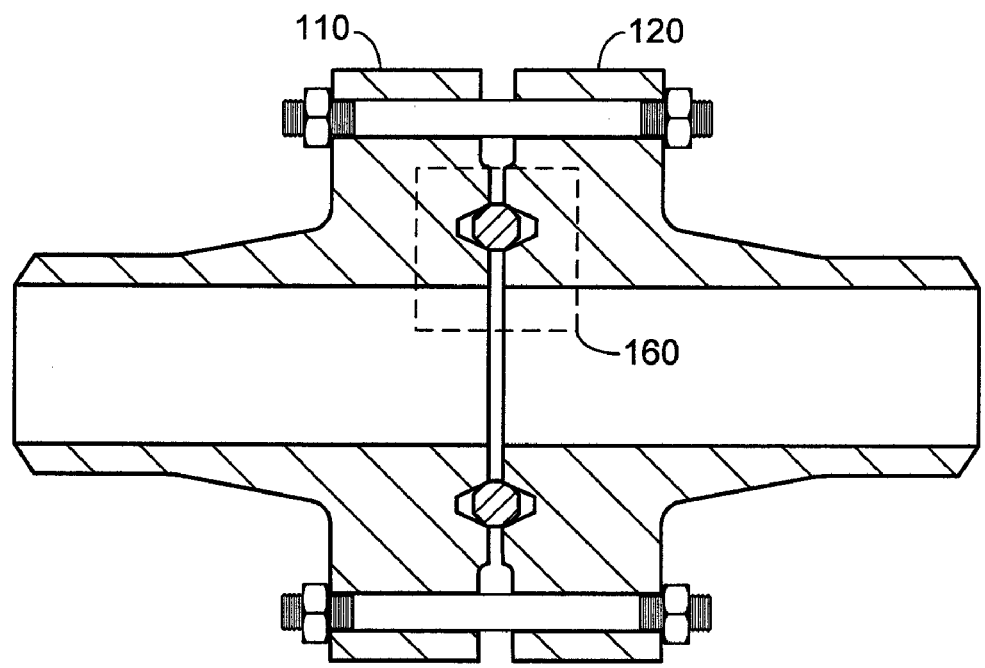

Before describing the exemplary embodiments of the invention, it will be helpful to describe the structure of typical prior art pipe connections. Referring to FIGS. 1A and 1B, cross-sectional diagrams illustrating the structure of a conventional ANSI-type connection for coupling pipe sections are shown. FIG. 1A illustrates the disassembled components of the connection, while FIG. 1B illustrates the assembled connection.

Referring to FIG. 1A, the connection includes two flanges (110, 120) a gasket or seal ring 130, and a set of nuts (e.g., 140) and bolts (e.g., 150) flanges 110 and 120 are identical. Each flange includes a neck (111) which has a beveled end (e.g., 112) to facilitate welding of the flange to a pipe section the flange has a portion (e.g., 113) which extends radially outward and has bolt holes therethrough to allow the flanges to be bolted together. The flange has a bore (e.g., 114) that forms a conduit through the flange. Each flange has a face (e.g., 115) which is flat, except for a recessed seal seat (e.g., 116) that is configured to receive seal ring 130.

Referring to FIG. 1B, the assembled connection is shown. It can be seen in this figure that flanges 110 and 120 are positioned with their respective faces toward each other, with seal ring 130 between them. Seal ring 130 is positioned in the seal seat of each flange. The flanges are held together by the set of nuts and bolts which are inserted through the bolt holes at the periphery of each flange. As the nuts are tightened onto the bolts, the two flanges are drawn toward each other, applying contact pressure between the respective faces of the flanges and seal ring 130. Typically, the contact pressure applied between flanges 110 and 120 and seal ring 130 is sufficient to deform the seal ring and cause it to conform to the contours of the seal seats and flange faces.

Figure 2:
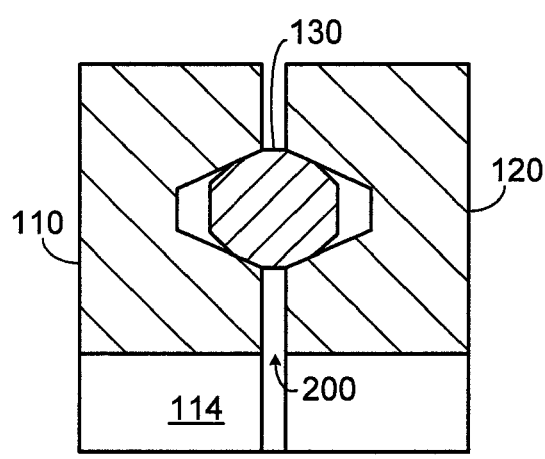
FIG. 2 is a detailed view of a seal in an assembled ANSI-type connection.

Referring to FIG. 2, a more detailed view of the assembled ANSI-type connection is shown. The portion of the connection illustrated in FIG. 2 is indicated by dashed box 160 in FIG. 1B. It can be seen from both FIG. 1B and FIG. 2 that, when the connection is assembled, there remains a gap 200 between flanges 110 and 120. As explained above, it is desirable when assembling the connection to apply a desired amount of contact pressure between the flanges and the seal ring. In practice, this means tightening the nuts on the bolts until a desired torque (corresponding to the desired contact pressure) is achieved. The connection is designed to have gap 200 because manufacturing tolerances make it difficult, if not impossible, to know that the desired contact pressure would be achieved at the exact point at which the flanges contact each other (and prevent further contact pressure from being applied.) For instance, if the connection is designed to apply a desired contact pressure when the flanges make contact with each other, seal seats which are slightly deeper than the nominal design, in combination with a seal ring that is slightly narrower than nominal might cause the contact pressure to be less than desired when the flanges contact each other. Gap 200 allows the connection to accommodate some manufacturing error by allowing the connection to the further tightened if the desired contact pressure is not achieved when the flanges are a predetermined distance from each other.

Figure 3:
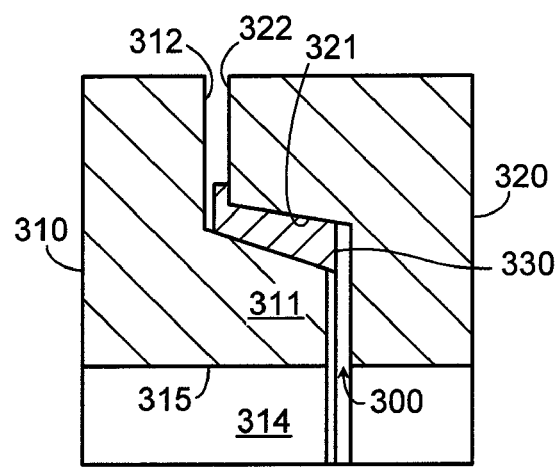
FIG. 3 is a diagram illustrating the structure of a seal in an alternative prior art connection.

Referring to FIG. 3, a diagram illustrating the structure of the seal in an alternative prior art connection is shown. FIG. 3 depicts a connection which uses a pair of male and female flanges and a tapered seal ring to provide the seal in the connection. It can be seen this figure that flange 310 has a male nose portion 311 which extends forward from a flat face portion 312. Female flange 320, on the other hand, has a female pocket 321 which is recessed into a flat face portion 322. The sealing surfaces of nose 311 and pocket 321 are conically tapered (i.e., the surfaces form conic sections that appear tapered in the cross-section of the figure.) Seal ring 330 has surfaces which are complementary to the sealing surfaces of nose 311 and pocket 321.

The tapered design of seal ring 330 and the sealing surfaces of nose 311 and pocket 321 allow the design to accommodate somewhat more manufacturing error than the ANSI-type connection because axial movement of the flanges (horizontal in the figure) causes a proportionally lower movement of the sealing surfaces toward each other. Nevertheless, connections using these types of seals are conventionally designed to achieve the desired contact pressure without allowing the flanges to make direct contact with each other. In other words, they are designed to maintain a gap 300 between the flanges at the wall 315 of conduit 314 through the connection.

As noted above, gap 200 (or 300) may cause problems in some applications, such as crevice corrosion or the buildup of scale or polymer material at the gap. Embodiments of the invention therefore eliminate this gap. Two exemplary embodiments are described below to illustrate some of the possible implementations of the invention. Each embodiment provides a conduit through the respective connection which has a wall that is substantially free of gaps at the interface between the flanges.

Figure 4:
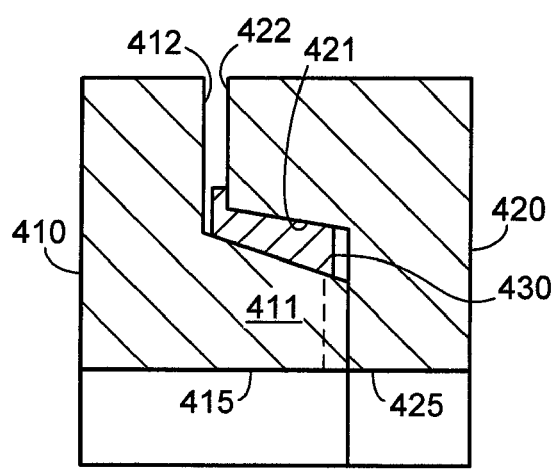
FIG. 4 is a cross-sectional diagram illustrating the structure of a pipe connection in accordance with one embodiment.

Referring to FIG. 4, a cross-sectional diagram illustrating the structure of a pipe connection in accordance with one embodiment is shown. FIG. 4 is a detailed view of the seal structure of the connection and would replace the prior art structures illustrated in FIGS. 2 and 3. The structure of the remainder of the connection could be essentially as described in connection with FIGS. 1A and 1B.

As shown in FIG. 4, the connection includes a pair of flanges 410 and 420, and a tapered seal ring 430. Similar to the seal of FIG. 3, male flange 410 has a nose portion 411 which extends forward from a flat face portion 412, and female flange 420 has a female pocket 421 which is recessed into a flat face portion 422. The sealing surfaces of nose 411 and pocket 421 are conically tapered, with the sealing surface of nose 411 facing radially outward and the sealing surface of pocket 421 facing radially inward. Seal ring 430 has surfaces which are complementary to the sealing surfaces of male nose 411 and female pocket 421.

The seal of FIG. 4 differs from the seal of FIG. 3 in that nose portion 411 of male flange 410 extends further forward from flat surface 412 than in the design of FIG. 3. The dashed vertical line at the right side of nose 411 indicates the length of nose 311 in the prior art design. The extended length of nose portion 411 causes the nose to make contact with female flange 420 (i.e., bottom out) in the assembled connection, thereby eliminating the gap between the flanges. Conduit wall 415 of male flange 410 and conduit wall 425 of female flange 420 consequently form a substantially continuous, gap-free conduit wall through the connection.

Because of the tapered design of seal ring 430 and the corresponding sealing surfaces of flanges 410 and 420, the bottoming out of the connection does not compromise the integrity of the seal. This is true for several reasons. For instance, the tapered sealing surfaces cause much higher contact pressure to be generated between the seal ring and flanges, compared to an ANSI-type flange with the same bolt stresses. Further, assembly of the connection does not deform the tapered seal ring, so the contact pressure on the seal ring increases until the connection is bottomed out (where the ANSI-type seal ring deforms during assembly and bottoming out the connection takes loading off the seal ring, rather than increasing the contact pressure on the seal ring.) Still further, because the sealing surfaces are angled with respect to the axis of the flanges (along which the flanges are drawn together) the change in the distance between the flange sealing surfaces changes more slowly than the distance between the flat surfaces (412, 422) of the flanges, providing more margin for error in the tightening of the flanges and achieving the desired contact pressure.

Figure 5:
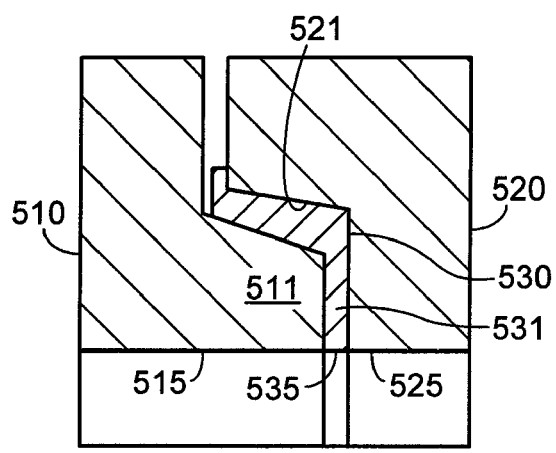
FIG. 5 is a cross-sectional diagram illustrating the structure of a pipe connection in accordance with an alternative embodiment.

Referring to FIG. 5, a cross-sectional diagram illustrating the structure of a pipe connection in accordance with an alternative embodiment is shown. FIG. 5 is a detailed view of the seal structure of the connection. The structure of the remainder of the connection could be essentially as described in connection with FIGS. 1A and 1B.

The connection of FIG. 5 includes male flanges 510, female flange 520 and a tapered seal ring 530. As in the seal of FIG. 4, male flange 510 has a nose portion 511 which extends forward from a flat face portion 512, and female flange 520 has a female pocket 521 which is recessed into flat face portion 522. The sealing surfaces of nose 511 and pocket 521 are conically tapered. The sealing surface of nose 511 faces radially outward, while the sealing surface of pocket 521 faces radially inward. Seal ring 530 has surfaces which are complementary to the sealing surfaces of male nose 511 and female pocket 521.

The difference between the seal of FIG. 5 and that of FIG. 4 is that seal ring 530 includes a portion 531 which extends radially inward to fill the gap between nose portion 511 of male flange 510 and female flange 520. Nose portion 511 is not extended in the same manner as nose portion 411 in the embodiment of FIG. 4, but is instead configured according to the conventional design of nose portion 311 in FIG. 3. Thus, in the assembled connection, the wall of the conduit through the connection is formed by conduit wall 515 of male flange 510, conduit wall 535 of seal ring 530 and conduit wall 525 of female flange 520.

Figure 6:
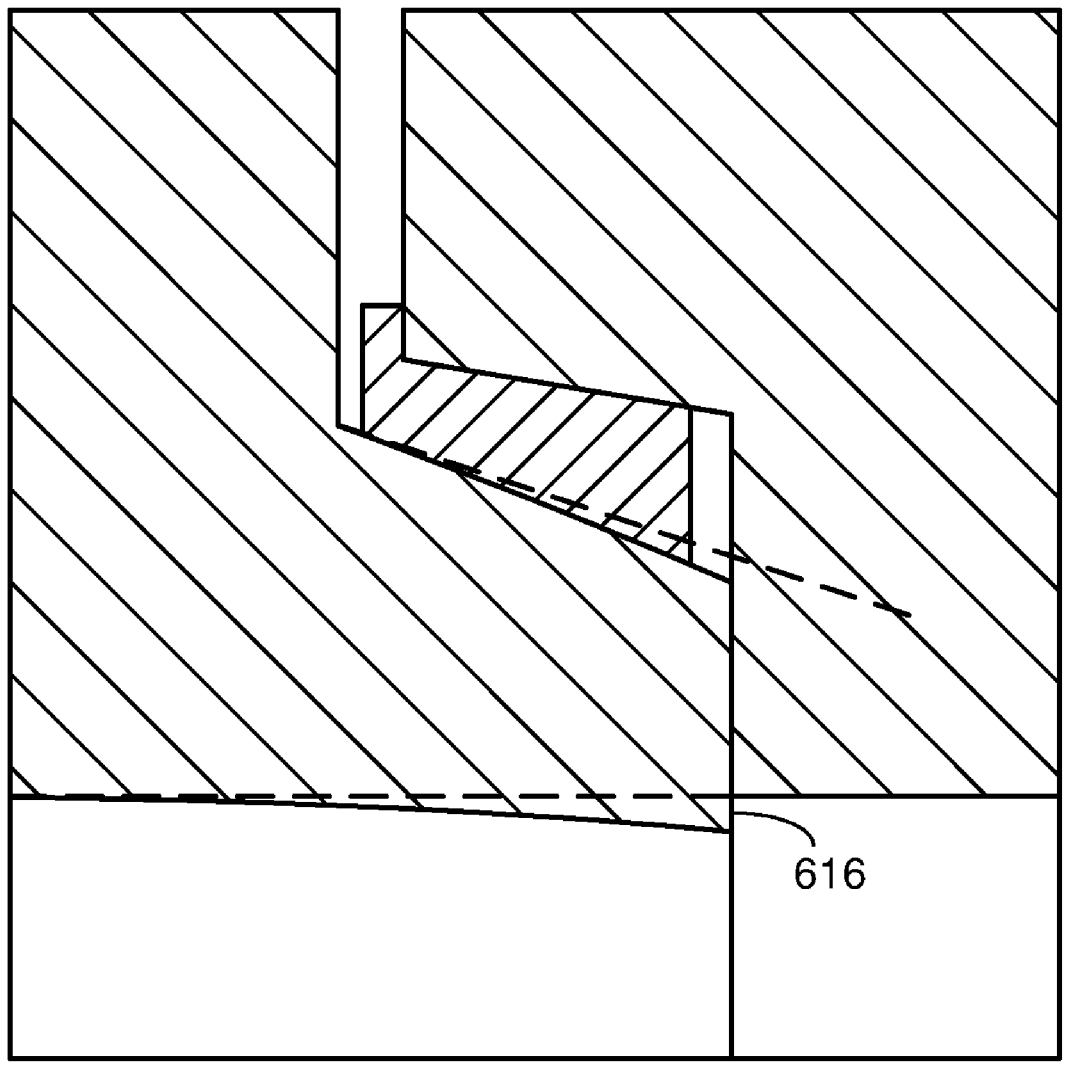
FIG. 6 is a cross-sectional diagram illustrating the structure of a pipe connection in accordance with the embodiment of FIG. 4.

It should be noted that, because the tapered sealing surfaces used in the present seal structure apply contact pressure to the nose of the male flange and may cause the nose to deform slightly, deflecting radially inward. This is illustrated in FIG. 6, which is a cross-sectional diagram illustrating the structure of the pipe connection in accordance with the embodiment of FIG. 4. The dashed lines in the figure show the original angles of the sealing surface and conduit wall of the nose of the male flange. It can be seen that when the nose is pushed inward, the conduit wall is not smooth, but instead has a lip or corner. This lip may cause turbulence or stagnation in the flow of fluids through the connection similar to those caused by gaps in the conduit wall, leading to build-up of solidified material or crevice corrosion. It may therefore be desirable to machine the conduit wall of the assembled connection in order to remove the lip and form a smooth conduit wall. This may not be necessary in all embodiments, however, as material properties (and the corresponding amount of deflection) may vary, or the flanges may be originally manufactured to account for the deflection.

It should be noted that the embodiments described are merely illustrative of the invention, and many alternative embodiments are possible. Alternative embodiments may differ from the above embodiments in ways such as the particular features that are incorporated therein, or the manner in which these features are implemented. For instance, although the embodiments described above use bolts to connect the flanges to each other and to apply contact pressure to the seals, alternative embodiments may use clamps or other means to connect the flanges. Still other variations are also possible.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

What is claimed is:

1. A gapless pipe connection comprising:
   a female flange having an inward-facing conically tapered sealing surface;
   a male flange having an outward-facing conically tapered sealing surface; and
   a seal ring having an outward-facing conically tapered surface complementary to the sealing surface of the female flange and an inward-facing conically tapered surface complementary to the sealing surface of the male flange;
   wherein the seal ring is positioned between the male and female flanges with the conically tapered surfaces of the seal ring in contact with the complementary sealing surfaces of the male and female flanges and the male and female flanges are coupled together to form a pipe connection having a conduit therethrough;
   wherein a conduit wall formed by the connection is substantially free of gaps between the male flange and the female flange, and
   wherein a nose portion of the male flange is configured to be deformed by contact pressure from the seal ring in the assembled connection, wherein the nose portion of the male flange is configured to have a first inner diameter when the connection is not assembled and a second inner diameter which is less than the first inner diameter when the connection is assembled.

2. The gapless pipe connection of claim 1, wherein a nose portion of the male flange is in contact with a pocket portion of the female flange at the conduit wall.

3. The gapless pipe connection of claim 1, wherein the conduit wall has the second inner diameter.

4. The gapless pipe connection of claim 1, wherein the seal ring comprises a tapered portion which includes the inward-facing and outward-facing conically tapered surfaces, and a second portion which extends radially inward from the tapered portion, wherein a nose portion of the male flange is in contact with a first side of the second portion of the seal ring and a pocket portion of the female flange is in contact with a second side of the second portion of the seal ring at the conduit wall.

5. The gapless pipe connection of claim 1, wherein the seal ring has a wedge-shaped cross-section.

6. A method for making a gapless pipe connection, the method comprising:
   providing a female flange having an inward-facing conically tapered sealing surface;
   providing a male flange having an outward-facing conically tapered sealing surface;
   providing a seal ring having conically tapered surfaces complementary to the sealing surfaces of the male and female flanges;
   positioning the seal ring between the conically tapered surfaces of the male and female flanges; and
   drawing the male and female flanges together until two or more of the male flange, the female flange and the seal ring make contact with each other, thereby deforming a nose portion of the male flange and forming a conduit wall which is substantially free of gaps.

7. A method for manufacturing a gapless pipe connection, the method comprising:
   providing a female flange having an inward-facing conically tapered sealing surface;
   providing a male flange having an outward-facing conically tapered sealing surface;
   providing a seal ring having conically tapered surfaces complementary to the sealing surfaces of the male and female flanges;
   assembling a pipe connection by positioning the seal ring between the conically tapered surfaces of the male and female flanges and drawing the male and female flanges together until two or more of the male flange, the female flange and the seal ring make contact with each other, thereby deforming a nose portion of the male flange; and
   machining a conduit wall within at least the male flange to form a smooth bore through the pipe connection.

* * * * *